(12) United States Patent
Yoshimi (10) Patent No.: US 10,440,259 B2
(45) Date of Patent: Oct. 8, 2019

(54) ELECTRONIC DEVICE AND METHOD OF CONTROLLING THE SAME

(71) Applicant: CANON KABUSHIKI KAISHA, Tokyo (JP)

(72) Inventor: Takashi Yoshimi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/845,888

(22) Filed: Dec. 18, 2017

(65) Prior Publication Data

US 2018/0183992 A1    Jun. 28, 2018

(30) Foreign Application Priority Data

Dec. 28, 2016 (JP) ................. 2016-256770

(51) Int. Cl.
*H04N 5/232* (2006.01)
*G06F 3/048* (2013.01)
*G06F 3/0482* (2013.01)
*G06F 3/0488* (2013.01)

(52) U.S. Cl.
CPC ..... *H04N 5/23216* (2013.01); *H04N 5/23293* (2013.01); *G06F 3/0482* (2013.01); *G06F 3/0488* (2013.01)

(58) Field of Classification Search
CPC ............ H04N 5/23216; H04N 5/23293; G06F 3/0482; G06F 3/0488; G06F 3/0485; G06F 3/0487
USPC ............ 348/333.02, 333.01, 333.05, 333.09, 348/333.11, 333.12, 341, 34; 345/650, 345/661, 676, 173, 645; 715/713, 700, 715/763, 853, 823, 825, 841–843
See application file for complete search history.

(56) References Cited

U.S. PATENT DOCUMENTS

| 8,305,461 | B2 * | 11/2012 | Ishii ................. | H04N 5/76 348/231.2 |
| 2002/0063738 | A1 * | 5/2002 | Chung ............... | G09G 5/00 345/810 |
| 2002/0174202 | A1 * | 11/2002 | Kohyama ........... | G06F 15/177 709/220 |
| 2008/0295034 | A1 * | 11/2008 | Kamyama ........... | G06F 3/048 715/840 |
| 2010/0088643 | A1 * | 4/2010 | Ota ................... | G05F 3/048 715/835 |

(Continued)

FOREIGN PATENT DOCUMENTS

JP     2016-143347 A    8/2016

*Primary Examiner* — Marly S Camargo
(74) *Attorney, Agent, or Firm* — Canon USA, Inc., IP Division (57) ABSTRACT

An electronic device includes a selection unit, a first operation member, a second operation member, and a control unit for selecting, on a first setting screen, a first selection item indicating that a first processing is to be executed or a second selection item indicating that a first processing is not to be executed, wherein in a case where the first selection item is selected, the control unit performs control to execute the first processing in response to an operation for the second operation member but not for the first operation member, and wherein in a case where the second selection item is selected, the control unit performs control to change the first setting screen to another screen in response to an operation for the first operation member.

20 Claims, 8 Drawing Sheets

(56) References Cited

U.S. PATENT DOCUMENTS

| | | | |
|---|---|---|---|
| 2011/0057957 A1* | 3/2011 | Kasahara | G06F 5/34 |
| | | | 345/684 |
| 2014/0078370 A1* | 3/2014 | Yoshimi | H04N 5/23293 |
| | | | 348/333.01 |
| 2016/0004432 A1* | 1/2016 | Bernstein | G06F 3/0483 |
| | | | 715/757 |
| 2016/0241784 A1* | 8/2016 | Baek | H04N 5/23245 |
| | | | 348/333.02 |

* cited by examiner

ELECTRONIC DEVICE AND METHOD OF CONTROLLING THE SAME

BACKGROUND

Field

The present disclosure relates to an electronic device and a method of controlling the same.

Description of the Related Art

There are irreversible items, such as settings and storage medium initialization, that once such an irreversible item is selected, it is not easy to restore to an original state. As described in Japanese Patent Application Laid-Open No. 2016-143347, when a user opens a setting initialization setting screen from a menu, a confirmation screen is displayed before the initialization is executed. If the user selects "OK" or "cancel" on the confirmation screen and presses a SET button, the initialization is either executed or cancelled.

In the method discussed in Japanese Patent Application Laid-Open No. 2016-143347, only the option "OK" or "cancel" is changed, and the operation to press the SET button to execute or cancel the processing after the option is selected needs to be performed for both executing initialization and not executing initialization. Thus, if the user accidentally selects "OK" and then presses the SET button, initialization can be executed. To prevent erroneous erasure, a member different from a normal member can be used on an erasure confirmation screen. This, however, makes it difficult to exit for a user having opened the confirmation screen without an intent to perform erasing.

SUMMARY

The present disclosure is directed to a technique for preventing execution of an unintended function without impairing a user's operability.

According to an aspect of the present disclosure, an electronic device includes a selection unit that selects one of a plurality of selection items displayed on a display unit, a first operation member, a second operation member located farther from the selection unit than the first operation member, and a control unit that selects, on a first setting screen displayed on the display unit and is for setting a setting related to first processing, a first selection item indicating that the first processing is to be executed or a second selection item indicating that the first processing is not to be executed, wherein in a case where the first selection item is selected on the first setting screen, the control unit performs control to execute the first processing in response to an operation performed on the second operation member but does not execute the first processing in response to an operation performed on the first operation member, and wherein in a case where the second selection item is selected on the first setting screen, the control unit performs control to change the first setting screen to a screen different from the first setting screen in response to an operation performed on the first operation member.

Further features will become apparent from the following description of exemplary embodiments with reference to the attached drawings.

DESCRIPTION OF THE EMBODIMENTS

An exemplary embodiment will be described in detail below with reference to the attached drawings. It should be noted that the dimensions, shapes, relative locations, etc. of components described as examples in the exemplary embodiment are to be changed as needed depending on various conditions and configurations of apparatuses to which the present disclosure is applied, and the examples are not seen to be limiting. In the exemplary embodiment described below, a case in which an electronic device is applied to a digital camera that is an image capturing apparatus that captures both still and moving images will be described as an example.

[Configuration of Digital Camera]

Figure 1A:
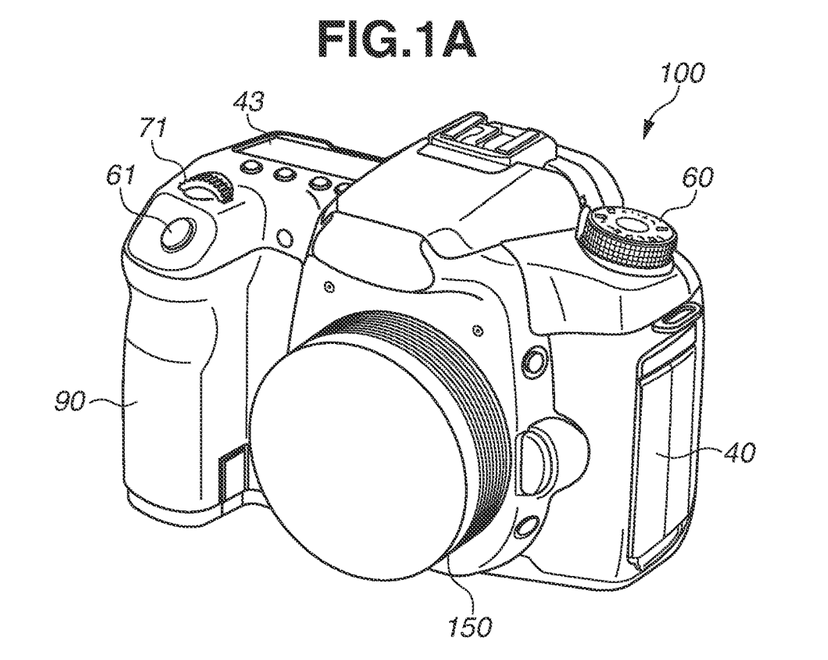
FIGS. 1A and 1B are external views illustrating a digital camera according to an exemplary embodiment.
Figure 1B:
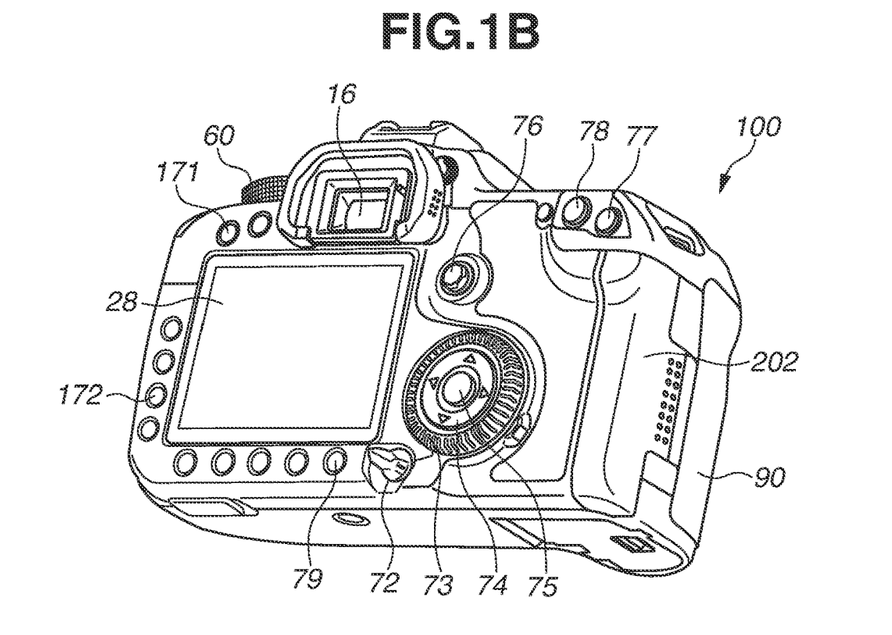

FIGS. 1A and 1B illustrate an external view of a digital camera 100 that is an example of an apparatus to which the exemplary embodiment is applicable. FIG. 1A is a perspective view illustrating a front side of the digital camera 100. FIG. 1B is a perspective view illustrating a rear side of the digital camera 100.

In FIG. 1B, a display unit 28 is provided on a rear surface of the digital camera 100 and displays images and various types of information. An outside-viewfinder display unit 43 is provided on a top surface of the digital camera 100 and displays various setting values of the digital camera 100, such as a shutter speed and an aperture. A lens unit 150 includes lenses.

A terminal cover 40 protects a connector (not illustrated), such as a connection cable, that connects the digital camera 100 to a connection cable that connects the digital camera 100 to an external device. A lid 202 is for a slot that stores a recording medium. A grip portion 90 is a handle portion enabling a user to easily hold the digital camera 100. When holding the digital camera 100 for image capturing, the user typically supports the grip portion 90 with the user's right hand and the lens unit 150 with the user's left hand. At this time, buttons and the like located on the right side of the display unit 28 are easily operated with the user's right hand, but a menu button 171 and an OK button 172 located on the left side are difficult to be operated. When the user is not holding the digital camera 100 for image capturing, the user can operate the buttons with both hands by holding the grip portion 90 with the user's right hand and the left handle portion of the digital camera 100 with the user's left hand. Specifically, the user can operate the buttons located on the right side of the display unit 28 with the user's right hand and the buttons located on the left side (left handle portion side) of the display unit 28 with the user's left hand.

Operation members are provided on a plurality of portions on the rear surface, top surface, side surfaces, etc. of the digital camera 100. The operation members include a plurality of operation members (corresponding to an operation unit 70 in FIG. 2) in addition to a mode selection switch 60 for selecting various modes, a shutter button 61 for providing an instruction to capture an image, and a power switch 72 for turning the digital camera's 100 power on/off.

The operation members included in the operation unit 70 will be described below. A main electronic dial 71 is a rotary operation member, and setting values such as a shutter speed and an aperture can be changed by rotating the main electronic dial 71. A sub-electronic dial 73 is also a rotary operation member that is used to change a selected frame, feed an image, etc. An arrow key 74 is a cross-shaped, four-directional key with top, bottom, left, and right portions each of which can be pressed. An operation corresponding to a pressed portion of the arrow key 74 is executable (A cursor can move, and an item can be selected). A SET button 75 is a push-button situated in the middle of the keys of the arrow key 74 and is used to mainly set an item. The SET button 75 is operated promptly after a key of the arrow key 74 is operated to perform selection and setting.

A live-view (LV) button 76 turns a LV on/off on a menu screen. In a moving image capturing mode, the LV button provides an instruction to start or stop capturing (recording) moving images. A zoom-in button 77 is an operation button that turns a zoom-in mode on/off and changes a zoom ratio in the zoom-in mode during the display of a live view in an image capturing mode. The zoom-in button 77, in a reproduction mode, functions as a zoom-in button for zooming in a reproduction image and increasing the zoom ratio. A zoom-out button 78 is an operation button that reduces the zoom ratio of an enlarged reproduction image to zoom out the displayed image.

A reproduction button 79 is an operation button to switch between the image-capturing mode and the reproduction mode. When the reproduction button 79 is pressed during the image-capturing mode, the image-capturing mode is changed to the reproduction mode to display the newest one of the images recorded on a recording medium 200 on the display unit 28. The menu button 171 is used to mainly call the menu screen or to exit a setting screen. On the menu screen, a list of a plurality of setting items is displayed, and a user selects one of the plurality of setting items to change the setting. On the menu screen are a list of setting items related to image capturing, a list of setting items related to reproduction, a list of setting items related to recording, and a list of setting items related to general camera settings. A user can select a setting item included in each of the lists on the menu screen. The user can select a list and then select and operate a setting item included in the selected list. The user can also sequentially switch the setting item to display the setting items in all the lists and select a setting item.

The OK button 172 is used to mainly set an item, etc., as well as the SET button 75. While the SET button 75 and the OK button 172 have the same function to set a selected item, the SET button 75 and the OK button 172 have different functions. The SET button 75 is used to mainly set a selected item after the item is selected from the plurality of items on the menu screen, etc., using the arrow key 74. In other words, the SET button 75 is used mainly after an item is selected using the arrow key 74. Being located near the arrow key 74, the SET button 75 is situated in a position with great operability when the user repeatedly selects and sets an item, when a change to the settings is made promptly, or when the user operates a button while holding the digital camera 100. The OK button 172 is a button that is usable even when no item is selected using the arrow key 74, etc. For example, the OK button 172 can be used to switch to the next screen where the user is not to select an item, such as a case where reports are sequentially displayed until communication is established on a screen where wireless communication is performed. In other words, when the user reads and understands the reports, the user presses the OK button 172 to switch to the next screen where the next report is displayed. The user operates the menu button 171 to return to the previous screen where the previous report is displayed. When guidance on image capturing methods or on editing methods are displayed, the user can press the OK button 172 each time the user checks contents of descriptions on each display screen to check the contents and provide an instruction to display the next page. As described above, the OK button 172 can be used to provide an instruction to confirm a function determined in advance for each screen instead of to confirm an item selected using the arrow key 74, etc.

The OK button 172 is also used on a screen on which the user sets time settings, such as the date and time, rather than a screen on which the user selects and operates a displayed candidate. When performing an operation to establish wireless communication or performing an operation to set the time, the user is likely to hold the digital camera 100 with both hands while performing the operations, rather than holding the digital camera 100 to capture an image. Thus, the OK button 172 is more intuitive and easy to understand for the user and, the user's operability is not likely to be impaired. While the operation members included in the operation unit 70 are described above, other operation members can also be provided besides the above-described operation members. A plurality of functions can be assigned to some of the above-described operation members and shared.

A viewfinder 16 is a viewfinder unit for visually recognizing a subject. The user looks into the viewfinder 16 to visually recognize an optical image (in a case of an optical viewfinder) or a LV image (in a case of an electronic viewfinder) of the subject.

Figure 2:
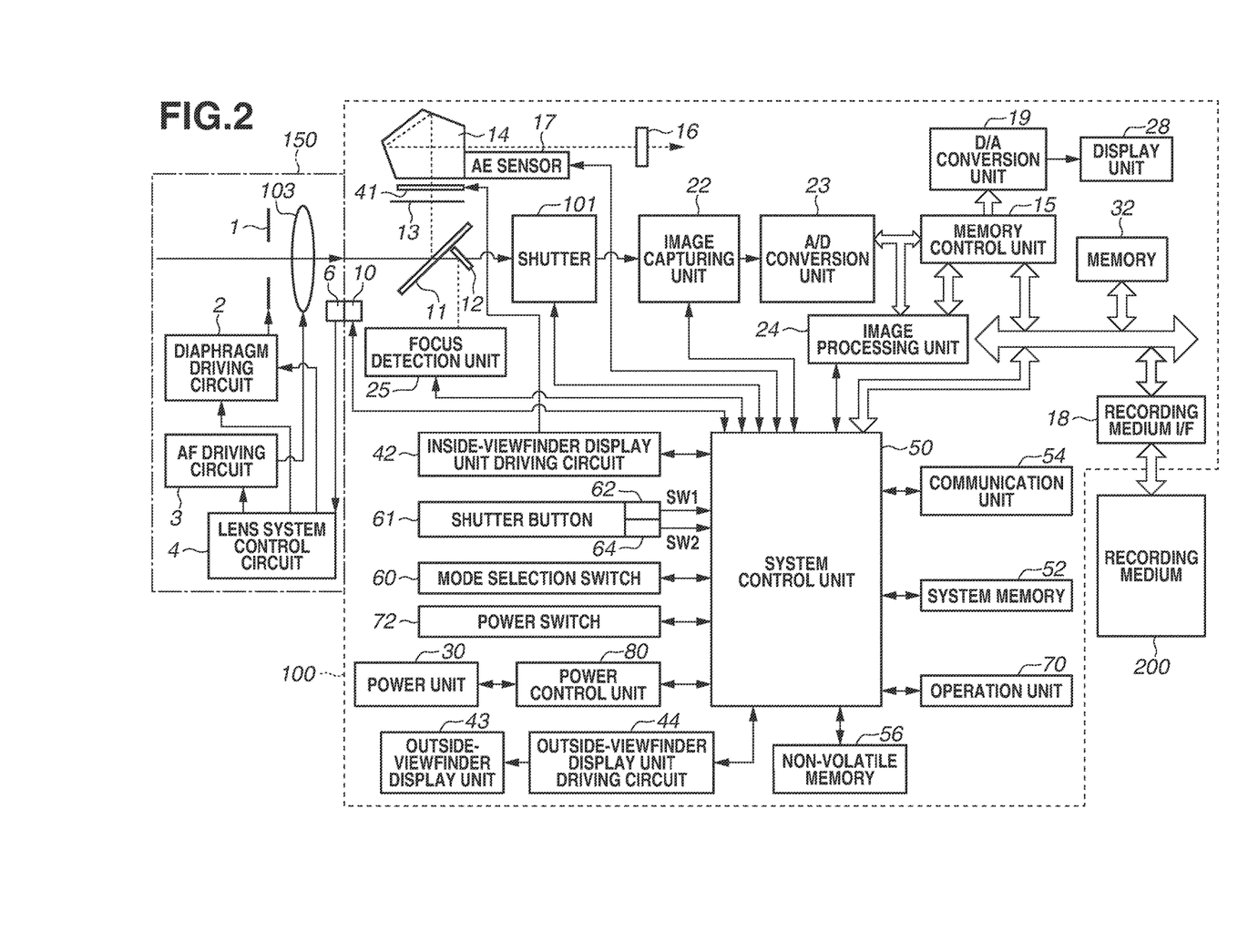
FIG. 2 is a block diagram illustrating a configuration of the digital camera and a lens unit according to an exemplary embodiment.

FIG. 2 is a block diagram illustrating an example of the configurations of the digital camera 100 and the lens unit 150, which is attachable to and removable from the digital camera 100, according to the present exemplary embodiment.

The lens unit 150 includes a lens 103. In general, the lens unit 150 includes a plurality of lenses, but the lens unit 150 is illustrated as a single lens in FIG. 2 to simplify the illustration. A communication terminal 6 is used by the lens unit 150 to communicate with the digital camera 100. A communication terminal 10 is used by the digital camera 100 to communicate with the lens unit 150. The lens unit 150 communicates with a system control unit 50 via the communication terminals 6 and 10 so that a lens system control circuit 4 controls a diaphragm 1 via a diaphragm driving circuit 2 and the position of the lens 103 is changed via an automatic focus (AF) driving circuit 3 to adjust a focus.

An incident light beam from the subject through the lens unit 150 enters a main mirror 11, which is an optical member. When a mirror inserted in an optical path is down, the main mirror 11 reflects the incident light beam to guide the light beam to a focusing screen 13. During the exposure, live view image capturing, or moving image capturing, the main mirror 11 is lifted upward (mirror-up) and retracted from the optical path by an actuator (not illustrated) based on an instruction from the system control unit 50 to guide the light beam to an image capturing unit 22 together with a sub-mirror 12, which is an optical member.

The light beam reflected upward by the main mirror 11 during the mirror-down forms an image as a subject image on the focusing screen 13. The user capturing an image observes the formed image via a pentaprism 14 and the viewfinder 16 to check a focal point and composition of the optical subject image acquired through the lens unit 150. An automatic exposure (AE) sensor 17 measures the luminance of the subject through the lens unit 150.

A central portion of the main mirror 11 is a half-mirror, which transmits a part of light. During the mirror-down, the main mirror 11 transmits a part of the light beam. The light beam transmitted through the main mirror 11 is bent downward by the sub-mirror 12 situated at the back and is guided to a focus detection unit 25. The focus detection unit 25 outputs to the system control unit 50 an output signal from a pair of line sensors situated inside and configured to perform photoelectric conversion. The system control unit 50 calculates the phase difference of the output signal to obtain a defocus amount, which indicates a focus adjustment state of the lens 103 with respect to the subject, and controls the lens unit 150 based on the obtained defocus amount to adjust the focal point.

A shutter 101 is a focal plane shutter for controlling the exposure time of the image capturing unit 22 based on the control by the system control unit 50. The image capturing unit 22 is an image capturing element including a charge-coupled device (CCD) element and a complementary metal oxide semiconductor (CMOS) element configured to convert an optical image into an electric signal. An analog/digital (A/D) conversion unit 23 converts analog signals output from the image capturing unit 22 into digital signals.

An image processing unit 24 performs predetermined pixel interpolation processing, resizing processing such as zoom-out processing, and color conversion processing on data from the A/D conversion unit 23 or data from a memory control unit 15. The image processing unit 24 performs predetermined calculation processing using image data output from the A/D conversion unit 23, and the system control unit 50 performs exposure control and focus adjustment control based on the acquired calculation result. In this way, through-the-lens (TTL) AF processing, AE processing, and electronic flash (EF) processing are performed. The image processing unit 24 also performs predetermined calculation processing using image data output from the A/D conversion unit 23 and performs TTL automatic white balance (AWB) processing based on the acquired calculation result.

Output data from the A/D conversion unit 23 is written to a memory 32 via the image processing unit 24 and the memory control unit 15 or via the memory control unit 15. The memory 32 stores image data acquired by the image capturing unit 22 and converted into digital data by the A/D conversion unit 23 and image data to be displayed on the display unit 28. The memory 32 has sufficient storage capacity to store a predetermined number of still images and a predetermined length of time of moving images and audio data.

The memory 32 is also a memory (video memory) for image display. A digital/analog (D/A) conversion unit 19 converts the data for image display stored in the memory 32 into analog signals and supplies the analog signals to the display unit 28. The image data for display thus written to the memory 32 is displayed on the display unit 28 via the D/A conversion unit 19. The display unit 28 is a display device such as a liquid crystal display (LCD) and performs displaying corresponding to the analog signals from the D/A conversion unit 19. As described above, digital signals that are A/D converted by the A/D conversion unit 23 and then stored in the memory 32 are analog converted by the D/A conversion unit 19 and sequentially transferred to the display unit 28 to be displayed. In this way, the display unit 28 functions as an electronic viewfinder and displays through-images (live view display).

An inside-viewfinder liquid crystal display unit 41 displays via an inside-viewfinder display unit driving circuit 42 a frame (AF frame) indicating a focus detection region where AF is currently performed, an icon indicating the camera setting state, etc. The outside-viewfinder display unit 43 displays via an outside-viewfinder display unit driving circuit 44 various camera setting values such as a shutter speed and an aperture.

A non-volatile memory 56 is an electrically erasable/recordable recording medium, for example, an electrically erasable programmable read-only memory (EEPROM). The non-volatile memory 56 stores constants, variables, programs, etc. for operations of the system control unit 50. As used herein, the term "program" includes computer programs for executing various flowcharts of the present exemplary embodiment as described below.

The system control unit 50 includes at least one processor and controls the entire digital camera 100. The system control unit 50 executes the programs recorded in the non-volatile memory 56 to realize the below-described processing. A system memory 52 uses a random-access memory (RAM), and the constants and variables for the operation of the system control unit 50, the programs read from the non-volatile memory 56, etc. are developed. The system control unit 50 controls the memory 32, the D/A conversion unit 19, the display unit 28, etc. to perform display control.

The mode selection switch 60, a first shutter switch 62, a second shutter switch 64, and the operation unit 70 are operation units for inputting various operation instructions to the system control unit 50. The mode selection switch 60 switches the operation mode of the system control unit 50 to one of a still image recording mode, a moving image capturing mode, a reproduction mode, etc. Examples of modes included in the still image recording mode include an automatic image-capturing mode, an automatic scene discrimination mode, a manual mode, a diaphragm priority mode (Av mode), and a shutter speed priority mode (Tv mode). Other examples include various scene modes that are image capturing settings different for each image capturing scene, a program AE mode, and a custom mode. The operation mode can be switched directly to one of the above-described modes with the mode selection switch 60. Alternatively, after the operation mode can be switched to an image-capturing mode list screen with the mode selection switch 60, one of a plurality of displayed modes is selected and the operation mode is switched to the selected mode with a different operation member. Similarly, the moving image capturing mode can include a plurality of modes.

The first shutter switch 62 is turned on in the middle of the operation of the shutter button 61 provided to the digital camera 100, when the first shutter switch 62 is half-pressed (image capturing preparation instruction), to generate a first shutter switch signal SW1. The system control unit 50 starts operations such as AF processing, AE processing, AWB processing, and EF processing in response to the first shutter switch signal SW1. The second shutter switch 64 is turned on when the operations of the shutter button 61 are completed, when the second shutter switch 64 is fully-pressed (image capturing instruction), to generate a second shutter switch signal SW2. The system control unit 50 starts a series of image capturing operations from the signal reading from the image capturing unit 22 to the writing of image data to the recording medium 200 in response to the second shutter switch signal SW2.

Each operation member of the operation unit 70 is assigned an appropriate function for each scene by selecting and operating one of various function icons displayed on the display unit 28 and acts as one of various function buttons. Examples of the function buttons include an end button, a return button, an image feed button, a jump button, a preview button, and an attribute change button. As described above, the operation unit 70 includes the main electronic dial 71, the sub-electronic dial 73, the arrow key 74, the SET button 75, the LV button 76, the zoom-in button 77, the zoom-out button 78, the reproduction button 79, the menu button 171, and the OK button 172. For example, a menu screen on which various settings are settable is displayed on the display unit 28 at the press of the menu button 171. The user can intuitively set various settings using the menu screen displayed on the display unit 28, the four-directional top, bottom, left, and right buttons of the arrow key 74, and the SET button 75.

A power control unit 80 includes a battery detection circuit, a direct current-direct current (DC-DC) converter, and a switch circuit for switching a block to be energized. The power control unit 80 detects the presence/absence of an attached battery, the type of the battery, and the amount of remaining battery. The power control unit 80 controls the DC-DC converter to supply a necessary voltage for a necessary period of time to each unit of the recording medium 200 based on the detection result and an instruction from the system control unit 50. The power switch 72 turns the power of the digital camera 100 on/off.

A power unit 30 includes a primary battery such as an alkali battery or lithium battery, a secondary battery such as a NiCd battery, NiMH battery, or Li battery, and an alternating current (AC) adapter. A recording medium interface (I/F) 18 is an interface for the recording medium 200 such as a memory card or a hard disk. The recording medium 200 is a memory card for recording captured images, and includes a semiconductor memory, an optical disk, or a magnetic disk.

A communication unit 54 is connected wirelessly or via a wired cable to transmit and receive video signals and audio signals. The communication unit 54 is connected to a wireless local area network (LAN) and the Internet. The communication unit 54 transmits, to an external device, an image (including a through-image) captured by the image capturing unit 22 and an image recorded in the recording medium 200. The communication unit 54 receives image data and other various pieces of information from the external device.

[Entire Process]

Figure 3:
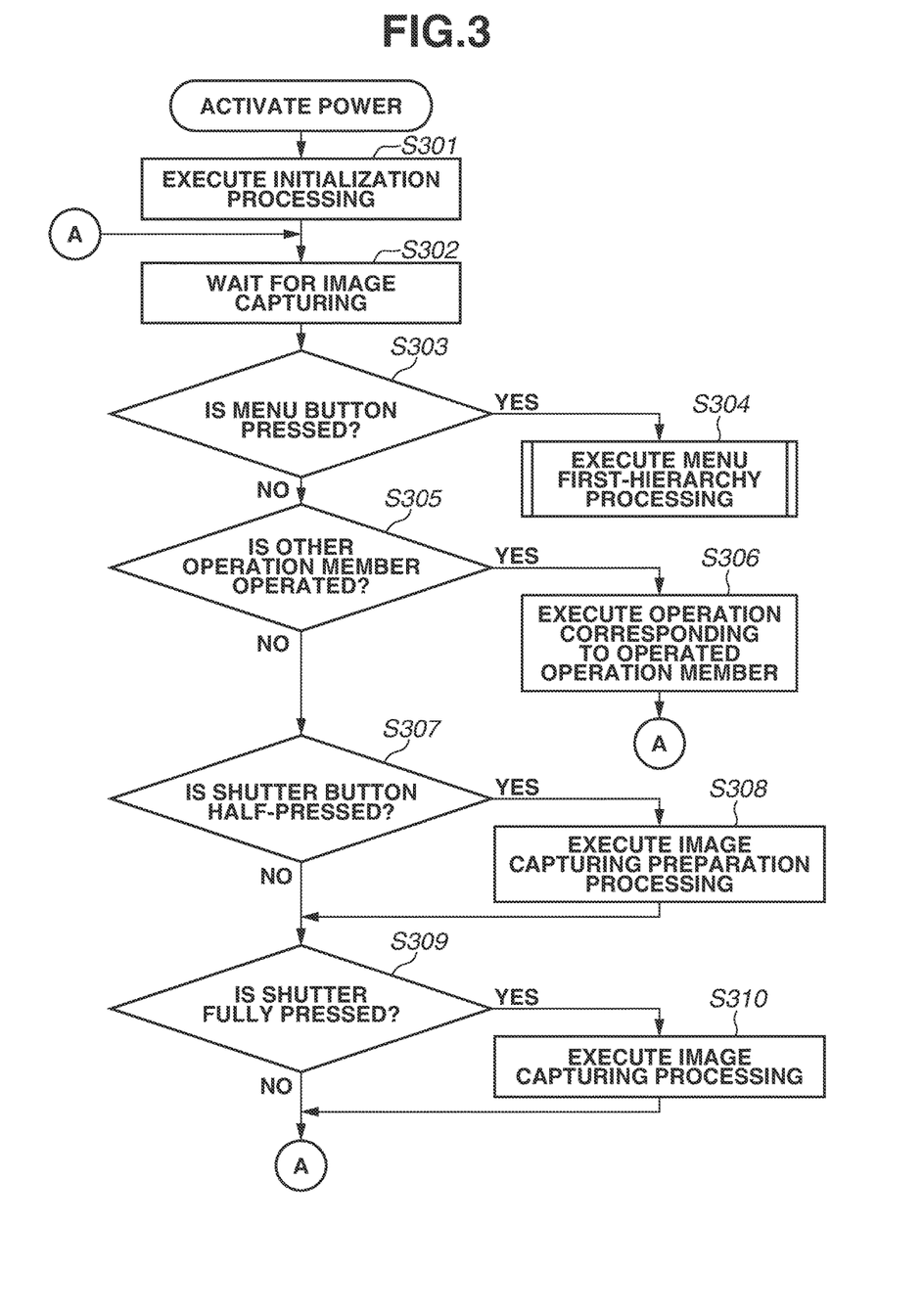
FIG. 3 is a flowchart illustrating a process from activation to still-image capturing according to an exemplary embodiment.

A process from activation to still image capturing that is performed by the digital camera 100 according to the present exemplary embodiment will be described below with reference to FIG. 3. The system control unit 50 loads a program stored in the non-volatile memory 56, etc. into the system memory 52 and executes the program to realize processing in a flowchart illustrated in FIG. 3.

If the power switch 72 is operated to turn on the power, then in step S301, the system control unit 50 initializes flags, control variables, etc. In step S302, a through image (live view image) is displayed on the display unit 28, and an image capturing standby state is entered to wait for various operations from the first shutter switch 62, the second shutter switch 64, and the operation unit 70.

In step S303, the system control unit 50 determines whether the menu button 171 is pressed. In a case where the menu button 171 is pressed (YES in step S303), the processing proceeds to step S304, and menu first hierarchy processing is executed. The menu first hierarchy processing will be described below with reference to a flowchart illustrated in FIG. 4. In a case where the menu button 171 is not pressed (NO in step S303), the processing proceeds to step S305.

In step S305, the system control unit 50 determines whether an operation member other than the menu button 171 and the shutter button 61 is operated. In a case where the system control unit 50 determines that an operation member other than the menu button 171 and the shutter button 61 is operated (YES in step S305), the processing proceeds to step S306. In step S306, processing corresponding to the operation performed on the operated operation member is executed, and the processing returns to step S302. In a case where the system control unit 50 determines that no operation member other than the menu button 171 and the shutter button 61 is operated (NO in step S305), the processing proceeds to step S307.

In step S307, the system control unit 50 determines whether the shutter button 61 is half-pressed to turn on the first shutter switch 62 (SW1 ON). In a case where the shutter button 61 is half-pressed (YES in step S307), the processing proceeds to step S308. In step S308, the system control unit 50 executes image capturing preparation processing such as AF processing and AE processing, and the processing proceeds to step S309. In a case where the shutter button 61 is not half-pressed (NO in step S307), the processing proceeds to step S309.

In step S309, the system control unit 50 determines whether the shutter button 61 is fully pressed to turn on the second shutter switch 64 (SW2 ON). In a case where the shutter button 61 is fully pressed (YES in step S309), the processing proceeds to step S310, and the system control unit 50 executes a series of operations of image capturing processing from the reading of signals from the image capturing unit 22 to the writing of image data to the recording medium 200. After the processing ends, the processing returns to step S302 to repeat the process.

The menu first hierarchy processing performed in step S304 will be described below with reference to FIG. 4. The menu first hierarchy processing is the processing performed in the first hierarchy of the menu at the press of the menu button 171. While setting operations with respect to various setting items are executable on the menu screen, a setting item to execute a setting operation is selected in the first hierarchy of the menu. Depending on the type of the setting item selected in the first hierarchy, the setting operation can be received in a second hierarchy. A setting item can be selected in the second hierarchy, and a setting operation can be received in a third or subsequent hierarchy.

Figure 7A:
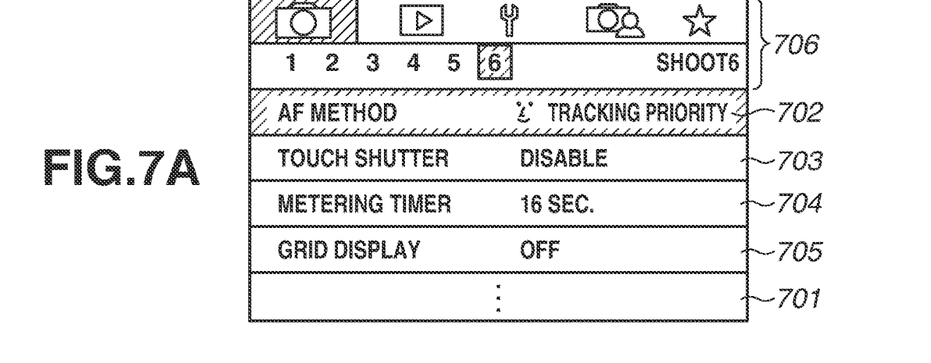
FIGS. 7A, 7B, and 7C illustrate an example of a menu screen in basic menu operation processing according to an exemplary embodiment.

In step S401, the system control unit 50 generates a menu screen of the first hierarchy of the menu according to the program written to the system memory 52, which is similar to a menu screen 701 illustrated in FIG. 7A, and displays the generated menu screen on the display unit 28. Items 702 to 705, which respectively correspond to different setting items, are displayed on the menu screen 701 in FIG. 7A. At this time, a cursor is placed on a currently-selected setting item (hereinafter, "item being selected") and displayed (to change into a focused state). On the menu screen 701 in FIG. 7A, the item 702 is selected, and a cursor 706 is displayed on the item 702.

In step S403, the system control unit 50 determines whether an operation to change a setting item to be selected is performed, i.e., whether an operation is performed on a button of the arrow key 74. In a case where an operation is performed (YES in step S403), the processing proceeds to step S404. In a case where no operation is performed (NO in step S403), the processing proceeds to step S407. Alternatively, a setting item to be selected can be changed by operating an electronic dial other than the arrow key 74. In step S404, the system control unit 50 changes into the focused state a selected setting item located in a direction specified by the operation performed in step S403, and the processing proceeds to step S407. On the menu screen 701 in FIG. 7A, in a case where a downward operation is performed (in a case where the down key of the arrow key 74 is operated), the state in which the item 702 is selected is changed to the state in which the item 703 is selected, so the cursor 706 is displayed on the item 703. In the present exemplary embodiment, the display of the selected setting item needs to be changed only such that the selected setting item is discriminable from unselected setting items, and the change to the display is not limited to the color change. There are various other possible methods, and examples include a method in which the brightness of the display is changed to darken unselected setting items and a method in which the frame and characters of a selected setting item are displayed boldly. As described above, the present exemplary embodiment is not limited by the display method.

In step S407, the system control unit 50 determines whether the SET button 75 is pressed. In a case where the SET button 75 is pressed (YES in step S407), the processing proceeds to step S409. In a case where the SET button 75 is not pressed (NO in step S407), the processing proceeds to step S408. In step S408, the system control unit 50 determines whether the OK button 172 is pressed. In a case where the OK button 172 is pressed (YES in step S408), the processing proceeds to step S409. In a case where the OK button 172 is not pressed (NO in step S408), the processing proceeds to step S412.

In step S409, the system control unit 50 determines whether the setting item (the setting item on which the cursor is displayed) being selected when the SET button 75 or the OK button 172 is pressed to confirm the operation in step S407 or S408 is a recording medium format setting to format a recording medium such as a memory card. While not illustrated in the menu screen 701 in FIG. 7A, a setting item of the recording medium format setting to format a recording medium such as a memory card is selectable in response to the operation to change the setting item to be selected in step S403. In a case where the selected setting item is the recording medium format setting (YES in step S409), the processing proceeds to recording medium format setting processing in step S410. In a case where the selected setting item is a setting item other than the recording medium format setting (NO in step S409), the processing proceeds to step S411 to move to the other menu operation processing. The processing performed in step S410 will be described in detail below with reference to FIG. 6. The processing performed in step S411 will be described in detail below with reference to FIG. 5. In a case where the processing in step S410 or S411 is completed, the processing returns to step S403.

In step S412, whether the menu button 171 is pressed is determined. In a case where the menu button 171 is pressed (YES in step S412), the processing proceeds to step S413. In step S413, the previous screen (through image) displayed before the menu screen is displayed is displayed, and the processing returns to the image capturing standby screen in FIG. 3. In the case where a reproduction screen is displayed before the menu screen is displayed, the reproduction screen is displayed. In a case where the menu button 171 is not pressed (NO in step S412), the processing returns to step S403, and the menu screen continues to be displayed.

Figure 7B:
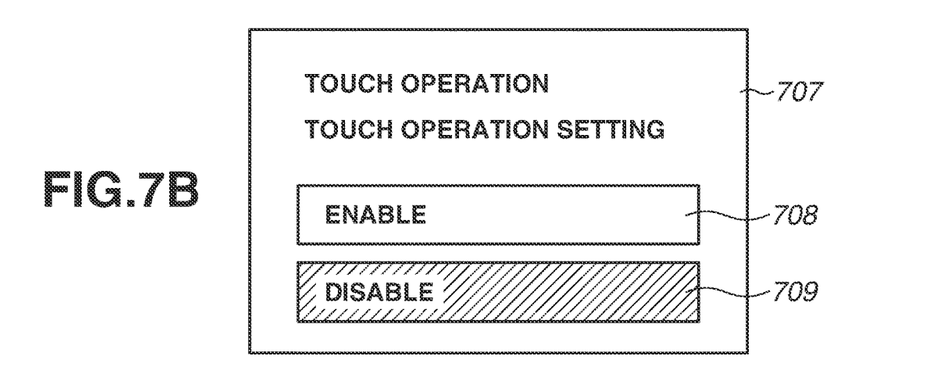

The processing performed in step S411 will be described below with reference to FIG. 5. In step S501, the system control unit 50 generates a menu screen (setting screen) for setting the item being selected in a case where the determination in step S409 in FIG. 4 is performed, and displays the generated menu screen on the display unit 28. In the case where a setting item indicating a touch operation is selected in step S409, a setting screen for receiving a setting related to a touch operation is displayed on the display unit 28, as illustrated in a menu screen 707 in FIG. 7B. In step S501, one of the items indicating setting candidates (selection items) is displayed in a selected state. In a case where the current setting is set to enable a touch operation, "enable" is changed into the selected state (state in which the cursor is displayed). In a case where the current setting is set to disable a touch operation, "disable" is changed into the selected state. As to the menu screen 707 in FIG. 7B, an item 708 indicating "enable" and an item 709 indicating "disable" are displayed with the item 708 being in the selected state.

In step S503, the system control unit 50 determines whether an operation to change the setting item to be selected is performed, i.e., whether a button of the arrow key 74 is operated. In a case where an operation is performed (YES in step S503), the processing proceeds to step S504. In a case where no operation is performed (NO in step S503), the processing returns to step S507. Alternatively, the setting item to be selected can be changed by operating an electronic dial other than the arrow key 74. In step S504, the system control unit 50 changes into the focused state a selected setting item located in a direction specified by the operation performed in step S503, and the processing proceeds to step S507. On the menu screen 701 in FIG. 7A, in a case where a downward operation is performed (in a case where the down key of the arrow key 74 is operated), the state in which the item 702 is selected is changed to the state in which the item 703 is selected, so the cursor 706 is displayed on the item 703. In the present exemplary embodiment, the display of the selected setting item needs to only be changed such that the selected setting item is discriminable from unselected setting items, and the change to the display is not limited to the color change. There are various other possible methods, including a method in which the brightness of the display is changed to darken unselected setting items and a method in which the frame and characters of a selected setting item are displayed boldly. As described above, the present exemplary embodiment is not limited by the display method.

In step S507, the system control unit 50 determines whether the SET button 75 is pressed. In a case where the SET button 75 is pressed (to confirm the operation) (YES in step S507), the processing proceeds to step S509. In a case where the SET button 75 is not pressed (NO in step S507), the processing proceeds to step S508. In step S508, the system control unit 50 determines whether the OK button 172 is pressed. In a case where the OK button 172 is pressed (to confirm the operation) (YES in step S508), the processing proceeds to step S509. In a case where the OK button 172 is not pressed (NO in step S508), the processing proceeds to step S510.

Figure 7C:
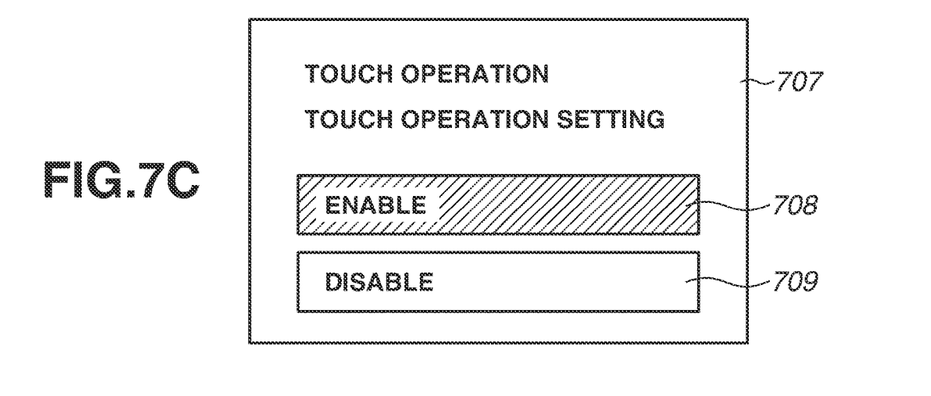

In step S509, the system control unit 50 confirms the selection item being selected when the SET button 75 or the OK button 172 is pressed to confirm the operation in step S507 or S508, and writes the setting value or the setting to the system memory 52. When the writing ends, the screen is returned to the screen on which the list of setting items is displayed, e.g., the menu screen 701 in FIG. 7A. In the case where the confirmation operation is performed on the menu screen 707 in FIGS. 7B and 7C, the touch operation is set to be either enabled or disabled.

As described above, the processing performed in response to an operation performed on the SET button 75 and the processing performed in response to an operation performed on the OK button 172 in the setting items other than the recording medium format setting processing are the same. Alternatively, a confirmation operation by pressing the OK button 172 can be disabled in the setting items other than the recording medium format setting processing.

In step S510, the system control unit 50 determines whether the menu button 171 is pressed. In a case where the menu button 171 is pressed (YES in step S510), the processing proceeds to step S511. In step S511, control is performed to return to the previous screen of the immediately above hierarchy, and the menu operation processing ends. In a case where the menu button 171 is not pressed (NO in step S510), the processing returns to step S503 to continue the menu operation processing.

Figure 6:
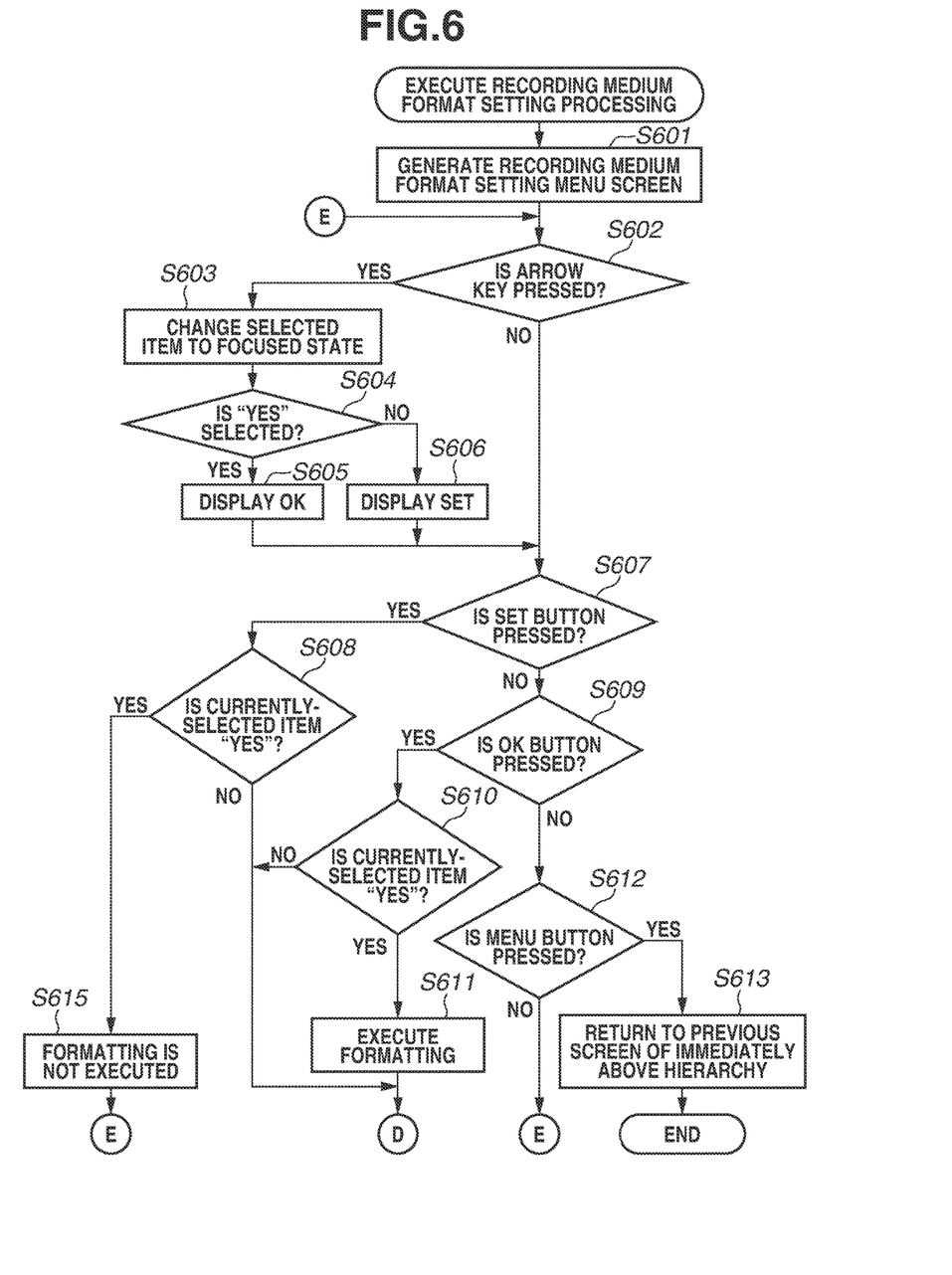
FIG. 6 is a flowchart illustrating recording medium format setting processing according to an exemplary embodiment.
Figure 8A:
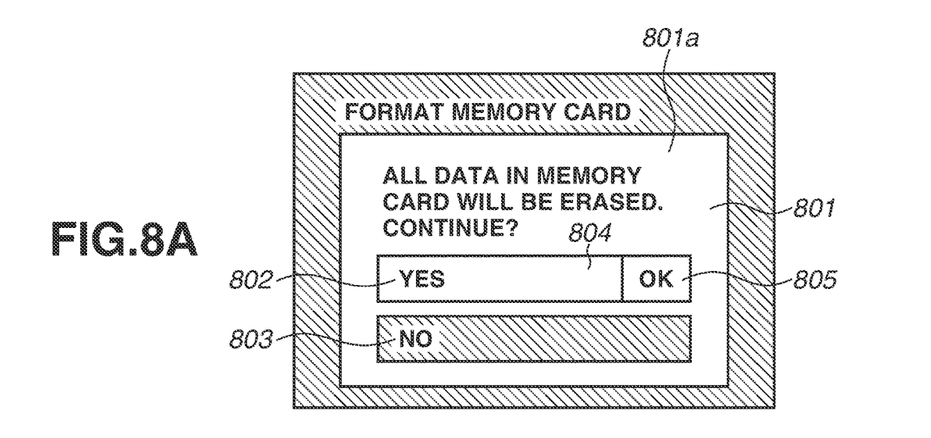
FIGS. 8A, 8B, and 8C illustrate an example of a recording medium format setting menu screen according to an exemplary embodiment.

The recording medium format setting processing performed in step S410 will be described below with reference to FIG. 6. In step S601, the system control unit 50 generates a recording medium format setting menu screen based on the program written to the system memory 52, and displays the generated menu screen on the display unit 28. A menu screen, such as a card format setting menu screen 801 illustrated in FIG. 8A, is displayed in step S601. At this time, "YES" of the choices "YES" and "NO" related to the card format is in the selected state, and an item 802 indicating "YES" and an item 803 indicating "NO" are displayed with a cursor 804 placed on the item 802. A guide 801a indicating that formatting the card will erase all the data in the card is displayed on the menu screen 801. In this way, a user unintentionally selecting card formatting can recognize that records in the card will be erased if the format processing is set to be executed.

The choice on which the cursor is placed when the menu screen 801 (confirmation screen) is first displayed can be set to "YES". If the cursor is placed on "YES" when the confirmation screen is displayed, the user can execute format processing by simply pressing the OK button 172. If the cursor is placed on "NO", the user having opened the confirmation screen to execute formatting needs to move the arrow key 74 with the cursor and then press the OK button 172, so the number of operations increases. Thus, the number of operations is reduced to improve user's operability if the cursor is initially placed on "YES".

Alternatively, the formatting can also be set executable by using the SET button 75 in the case where the cursor is placed on "NO" when the confirmation screen is displayed. Since the cursor is initially placed on "NO", a user intending to execute formatting needs to move the cursor and perform an operation to confirm "YES". Specifically, the user having performed an operation to change the choice from "NO" to "YES" is likely to intend to execute formatting, so user's operability increases if execution on the SET button 75 is receivable to enable prompt execution of formatting. While the position where the cursor is displayed when the setting screen is displayed changes depending on the current setting in the case of the touch operation setting illustrated in FIG. 5 in the above description, the display position of the cursor can be fixed to one of "YES" and "NO" in the case of the card formatting.

In step S602, the system control unit 50 determines whether an operation to change the setting item to be selected is performed, i.e., whether a button of the arrow key 74 is operated. In a case where such an operation is performed (YES in step S602), the processing proceeds to step S603. In a case where no such operation is performed (NO in step S602), the processing proceeds to step S607. Alternatively, the setting item to be selected can be changed by operating an electronic dial other than the arrow key 74. In step S603, the system control unit 50 changes to the focused state a selected setting item located in a direction specified by the operation performed in step S602, and the processing proceeds to step S604. On the menu screen 701 in FIG. 7A, if a downward operation is performed (if the down key of the arrow key 74 is operated), the state in which the item 702 is selected is changed to the state in which the item 703 is selected, so the cursor 706 is displayed on the item 703. In the present exemplary embodiment, the display of the selected setting item only needs to be changed such that the selected setting item is discriminable from unselected setting items, and the change to the display is not limited to the color change. There are various other possible methods, including a method in which the brightness of the display is changed to darken unselected setting items and a method in which the frame and characters of a selected setting item are displayed boldly. As described above, the present exemplary embodiment is not limited by the display method.

In step S604, the system control unit 50 determines whether the currently-selected selection item is "YES". In a case where the system control unit 50 determines that the currently-selected selection item is "YES" (YES in step S604), the processing proceeds to step S605. In a case where the system control unit 50 determines that the currently-selected selection item is not "YES" (NO in step S604), the processing proceeds to step S606.

In step S605, the system control unit 50 displays in a right portion of the item 802 indicating "YES" a guide 805 indicating that a confirmation operation is executable with the OK button 172. This enables the user to recognize that the card formatting of a memory is executed if the OK button 172 is operated while "YES" is in the selected state. This indicates that in the case of "YES", a confirmation operation is to be executed with the OK button 172 to prevent the user from executing an unintended confirmation operation. The user can recognize that while an operation to confirm a selection item of other setting items is to be executed also with the SET button 75, an operation to execute the card formatting is to be confirmed with the OK button 172. Thus, the user can recognize that, unlike the other selection items, the selection item should not be casually executed. Specifically, the user can recognize that the setting item is not the type of setting items that can be casually executed as a try and then undone to return to the previous setting in order to check the processing to be executed, a reflecting setting result, etc.

In step S605, the system control unit 50 displays in a right portion of the item 803 indicating "NO" a guide 806 indicating that a confirmation operation is executable with the "SET button". This enables the user to recognize that execution of the card formatting is prevented or the user can exit the menu screen 801 by operating the SET button 75 while "NO" is in the selected state. For a user having unintentionally selected the card formatting, an operation to erase records is an undesired operation, and the user desires to move to another desired setting item more promptly. Thus, a prompt operation following an operation of the arrow key 74 is possible if "NO" can be confirmed by an operation performed on the SET button 75, as in the cases of confirming a selection item of other setting items. In the case of "NO", the operation is the same as the operation performed in the cases of confirming a selection item of other setting items, so the guide 806 does not have to be displayed.

To highlight the guide 805 more, the guide 805 can be displayed to blink. In the present exemplary embodiment, the display of the selected setting item only needs to be changed such that the selected setting item is discriminable from unselected setting items, and the change to the display is not limited to the color change. There are various other possible methods including a method in which the brightness of the display is changed to darken unselected setting items and a method in which the frame and characters of a selected setting item are boldly displayed. As described above, the present exemplary embodiment is not limited by the display method. The guides 805 and 806 do not have to be displayed within the respective items and can be displayed in other regions within the menu screen 801.

In step S607, the system control unit 50 determines whether the SET button 75 is pressed. In a case where the SET button 75 is pressed (to confirm the operation) (YES in step S607), the processing proceeds to step S608. In a case where the SET button 75 is not pressed (NO in step S607), the processing proceeds to step S609. In step S608, the system control unit 50 determines whether the currently-focused item is "YES". In a case where the currently-focused item is "YES" (in FIG. 8A) (YES in step S608), then in step S615, recording medium formatting is not performed, and the processing returns to step S602. At this time, the guide 805 of the OK button 172 displayed on the display unit 28 can be highlighted more by causing the guide 805 to blink or by changing the color of the guide 805 to show the user that the formatting is executable with the OK button 172 instead of with the SET button 75.

Figure 4:
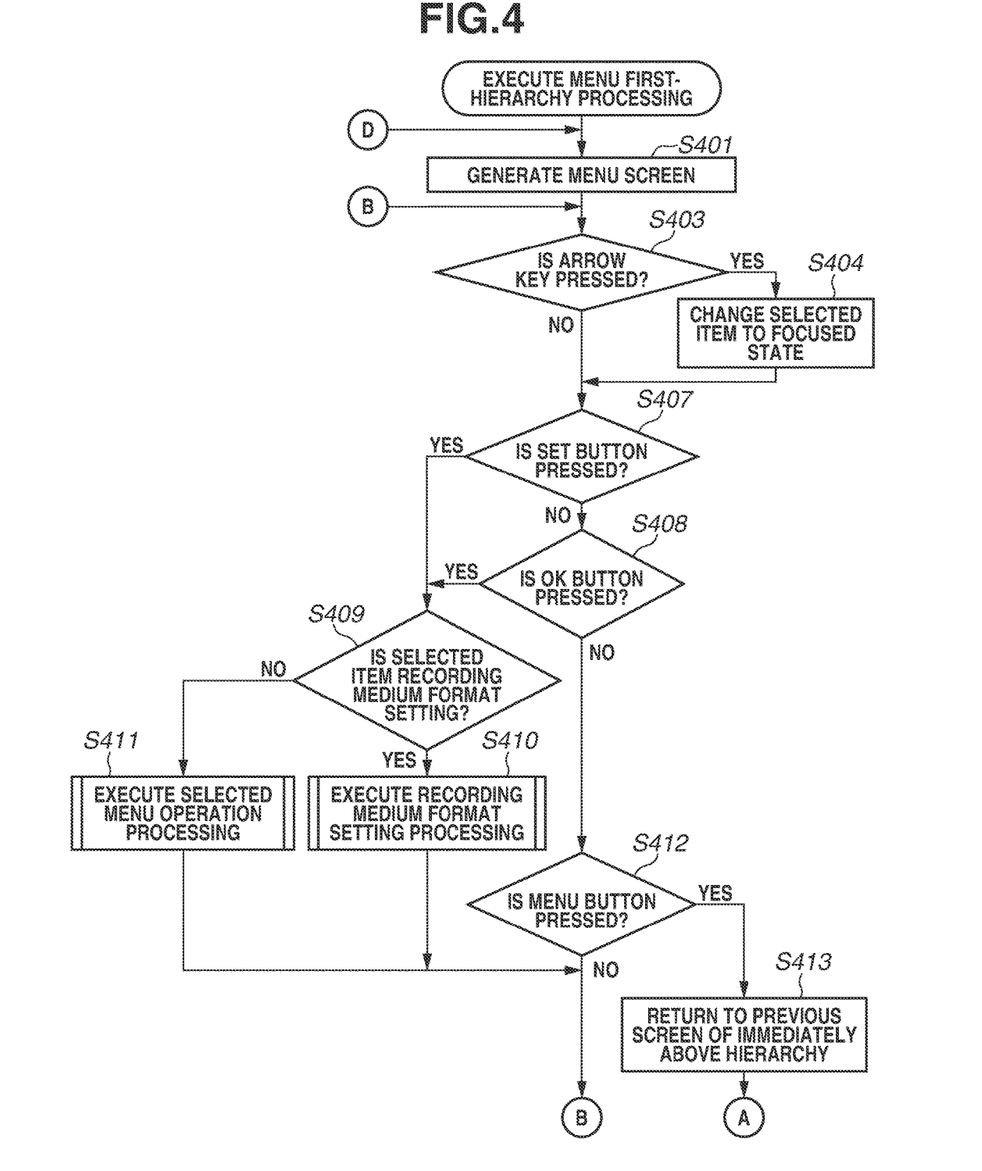
FIG. 4 is a flowchart illustrating menu first-hierarchy processing according to an exemplary embodiment.
Figure 8B:
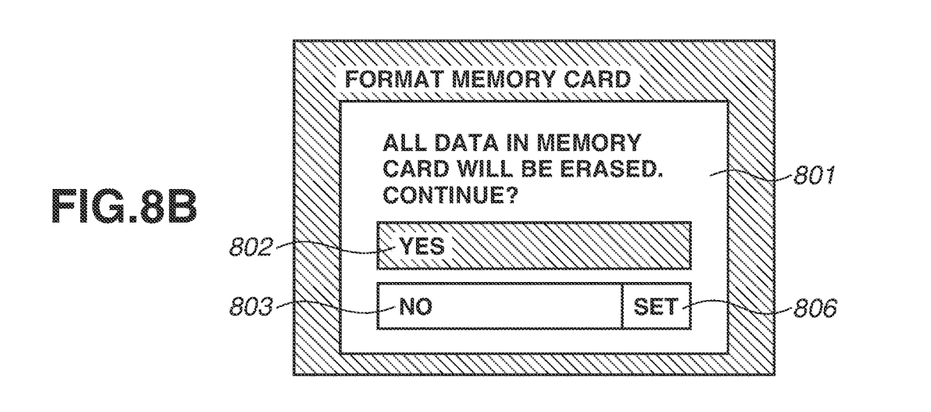

In a case where the system control unit 50 determines that the SET button 75 is not pressed in step S608 (No in step S608) and the currently-focused item is "NO" (FIG. 8B), the screen ends, and the processing returns to the menu first hierarchy processing in FIG. 4. As described above, in the format processing, an operation of the SET button 75 is disabled if the currently-selected item is "YES", whereas an operation of the SET button 75 is enabled if the currently-selected item is "NO".

In step S609, the system control unit 50 determines whether the OK button 172 is pressed. In a case where the OK button 172 is pressed (to confirm the operation) (YES in step S609), the processing proceeds to step S610. In a case where the OK button 172 is not pressed (NO in step S609), the processing proceeds to step S612. In step S610, the currently-focused item is determined. In a case where the currently-focused item is "YES" (in FIG. 8A) (YES in step S610), the processing proceeds to step S611. In a case where the currently-focused item is "NO" (in FIG. 8B) (NO in step S610), the screen ends, and the processing returns to the menu first hierarchy processing in FIG. 4. As described above, in the format processing, an operation of the OK button 172 is enabled regardless of whether the currently-selected item is "YES" or "NO".

In step S611, the system control unit 50 executes recording medium format processing, and when the execution is completed, the processing returns to the menu first hierarchy processing in FIG. 4. In step S611, image data, audio data, etc. recorded in the recording medium are erased.

In step S612, the system control unit 50 determines whether the menu button 171 is pressed. In a case where the menu button 171 is pressed (YES in step S612), the processing proceeds to step S613. In step S613, the system control unit 50 performs control to return to the previous screen of the immediately above hierarchy, and the recording medium format setting processing in FIG. 6 ends. In a case where the menu button 171 is not pressed (NO in step S612), the processing returns to step S602 to continue the recording medium format setting processing.

The above-described exemplary embodiment reduces the possibility that format setting processing is executed when the user does not intend the format setting processing to be executed.

Figure 8C:
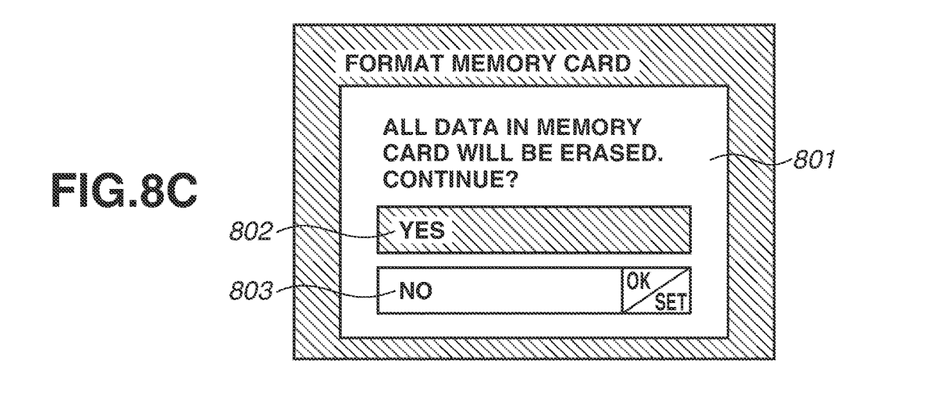

Since "NO" can be confirmed (set) with either the SET button 75 or the OK button 172, when the item 803 is selected, a guide can be displayed as illustrated in the menu screen 801 in FIG. 8C. Displaying "OK/SET" enables the user to recognize that a confirmation operation is executable with either the SET button 75 or the OK button 172.

While the SET button 75 is disabled to prevent execution of format processing when the focused item is "YES" in the case of the format setting processing in the above-described exemplary embodiment, an exemplary embodiment is not limited to the format setting processing. For example, an exemplary embodiment is also applicable to language setting processing (it is difficult to change settings to previous settings if the language is unintentionally set to an unfamiliar language), upload processing for uploading image data to a social networking service (SNS) (it is difficult to erase image data once the image data is uploaded), etc.

Figure 5:
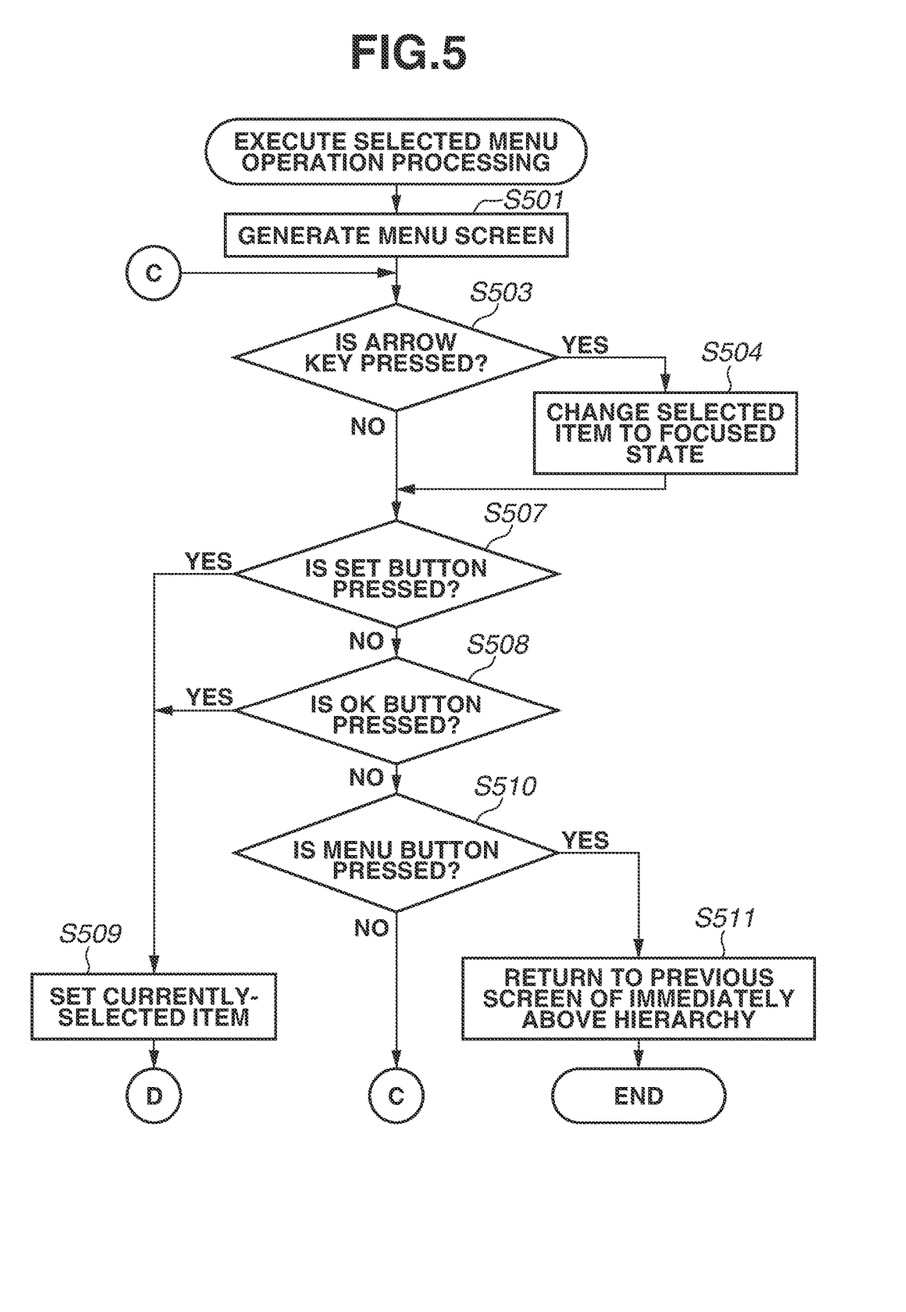
FIG. 5 illustrates is a flowchart illustrating menu operation processing on a basic menu screen according to an exemplary embodiment.

While the setting screen for enabling or disabling a touch operation in the menu operation processing in FIG. 5 is described above as an example, the setting screen is not limited to the above-described setting screen and can be a setting screen for setting other items. Specifically, the setting screen can be a setting screen for setting an AF-related setting (a selection item is selected from "single-point AF", "tracking AF", etc.) or a strobe setting (the amount of light emission is selected from "large", "medium", and "small"). The setting screen can be a setting screen for setting a power-saving setting (a selection item is selected from "ON" and "OFF"), a liquid crystal brightness setting (a level is selected from a plurality of levels, e.g., five levels), a mute setting, or a setting of setting values related to image capturing. The above-described setting items are reversible and can be returned to the previous setting value or state when an unintentional setting is set as far as the setting is reset on the same setting screen. Specifically, even if the AF-related setting is unintentionally set to the single-point AF on the AF setting screen, the AF-related setting can be returned to the tracking AF on the AF setting screen similarly to the time of setting the single-point AF. In the case of the card formatting, erased image data and the like cannot be restored after initialization is executed even if "NO" is selected on the same setting screen. The OK button 172 can be situated on the upper left (left shoulder) side when viewed from the display unit 28. For example, the OK button 172 can be situated on either the right-hand side or the left-hand side of the menu button 171. Alternatively, the OK button 172 can be situated on the left-hand side of the menu button 171 and near a camera edge.

While the SET button 75 and the OK button 172 are used differently to perform a confirmation operation in the above description of the exemplary embodiment, the exemplary embodiment is also applicable to a touch operation as well as the buttons. This will be described below in line with the above-described exemplary embodiment. While a setting item other than the card formatting is executable by touching a confirmation item located near a selection item or by touching a selection item twice, confirmation of execution of the card formatting can be as follows: execution of the card formatting can be confirmed by pressing a physical operation member such as a button or by touching a confirmation item located far from the selection item.

The above-described exemplary embodiment is also applicable to a case of selection and erasure in which an image to be erased is selected on the reproduction screen and then erased as well as the image erasure or the card formatting. Specifically, in a case where, for example, five images are selected and then the OK button 172 is pressed to display the confirmation screen, "YES" is confirmed with the OK button 172 while "NO" can also be confirmed with the SET button 75. This does not apply to a case where images are erased one by one by pressing an erasure button (not illustrated) while a single image is displayed. In such a case, the confirmation screen can be displayed at the press of the erasure button, and the image can be erased if the erasure button is pressed again, whereas the original screen can be restored if a cancel button is selected.

The control of the system control unit 50 can be performed by a single piece of hardware, or the processing can be shared by a plurality of pieces of hardware to control the entire apparatus.

While the present disclosure has been described in detail with reference to exemplary embodiments, it is to be understood that the invention is not limited to the disclosed exemplary embodiments, and various exemplary embodiments within the spirit of the invention are also encompassed within the scope of the invention.

While the application of the present disclosure is described with respect to the digital camera 100 as an example in the above-described exemplary embodiment, this example is not seen to be limiting. The above-described exemplary embodiment is applicable to any electronic device including an operation member that receives two or more confirmation operations. Specifically, the present invention is applicable to personal computers, personal digital assistants (PDAs), mobile phones, mobile image viewers, game machines, electronic book readers, etc.

Other Embodiments

One or more functions of the above-described exemplary embodiment is can be realized by supplying a program to a system or apparatus via a network or storage medium and the program is read and executed by one or more processors of a computer of the system or apparatus. The one or more functions can also be realized by a circuit (e.g., application-specific integrated circuit (ASIC)).

The above-described exemplary embodiment(s) prevents execution of an unintended function without impairing a user's operability.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-256770, filed Dec. 28, 2016, which is hereby incorporated by reference herein in its entirety.

What is claimed is:

1. An electronic device comprising:
a selection member;
a first operation member;
a second operation member located farther from the selection member than the first operation member; and
at least one memory and at least one processor that function as:
a control unit that selects, on a first setting screen displayed on a display unit for a setting related to first processing, one of a plurality of selection items including a first selection item and a second selection item in response to an operation performed on the selection member, wherein the first selection item indicates that the first processing is to be executed and the second selection item indicates that the first processing is not to be executed,
wherein in a case where the first selection item is selected on the first setting screen, the control unit performs control to execute the first processing in response to an operation performed on the second operation member but does not execute the first processing in response to an operation performed on the first operation member,
wherein in a case where the second selection item is selected on the first setting screen, the control unit performs control to change the first setting screen to a screen different from the first setting screen in response to an operation performed on the first operation member, and
wherein the first setting screen is a screen for determining whether to execute the first processing.

2. The electronic device according to claim 1, wherein after the first processing is executed, a previous state before execution of the first processing is not restored even in a case where the second selection item is selected on the first setting screen and the first operation member is operated.

3. The electronic device according to claim 1, wherein in a case where a third selection item related to second processing is selected from the third selection item and a fourth selection item on a second setting screen for setting a setting related to the second processing different from the first processing, the control unit performs control to set the third selection item in response to an operation performed on the first operation member, and
   wherein in a case where the fourth selection item is selected, the control unit performs control to set the fourth selection item in response to an operation performed on the first operation member.

4. The electronic device according to claim 3, wherein after the third selection item is set to change a state in which the fourth selection item is set on the second setting screen, the state in which the fourth selection item is set is restorable on the second setting screen.

5. The electronic device according to claim 3, wherein the second processing is processing that is performed to set a setting value of a setting item related to image capturing.

6. The electronic device according to claim 1, wherein in a case where the second selection item is selected on the first setting screen, the control unit performs control to change the first setting screen to the screen different from the first setting screen in response to an operation performed on the second operation member.

7. The electronic device according to claim 1, wherein the first processing is recording medium formatting.

8. The electronic device according to claim 1, wherein the first processing includes image uploading to the Internet or language setting.

9. The electronic device according to claim 1, wherein in a case where the first selection item is selected, the control unit performs control to display a guide indicating that the first selection item is settable by operating the second operation member.

10. The electronic device according to claim 1, wherein in a case where the second selection item is selected, the control unit performs control to display a guide indicating that the second selection item is settable by operating the first operation member.

11. The electronic device according to claim 1, further comprising:
   an image sensor; and
   wherein the at least one memory and at least one processor further function as a recording control unit configured to record image data captured by the image sensor in a recording medium.

12. The electronic device according to claim 1, wherein the first operation member and the selection member are located on a first handle portion side of the electronic device and the second operation member is located on a second handle portion side of the electronic device.

13. The electronic device according to claim 1, wherein the first operation member is an operation member that receives an instruction for setting a selection item selected by the selection member.

14. The electronic device according to claim 1, wherein the second operation member is an operation member that receives a pre-determined instruction for each display screen without a user's operation to select an item.

15. A method of controlling an electronic device including a first operation member and a second operation member located farther from a selection member than the first operation member, the method comprising:
   selecting, on a first setting screen displayed on a display unit for a setting related to first processing, one of a plurality of selection items including a first selection item and a second selection item in response to an operation performed on the selection member, that the first processing is to be executed and the second selection item indicates that the first processing is not to be executed,
   wherein in a case where the first selection item is selected on the first setting screen, executing the first processing in response to an operation performed on the second operation member, but not executing the first processing in response to an operation performed on the first operation member, and
   wherein in a case where the second selection item is selected on the first setting screen, changing the first setting screen to a screen different from the first setting screen in response to an operation performed on the first operation member,
   wherein the first setting screen is a screen for determining whether to execute the first processing.

16. A non-transitory computer-readable storage medium storing a program for executing a method of controlling an electronic device including a first operation member and a second operation member located farther from a selection member than the first operation member, the method comprising:
   selecting, on a first setting screen displayed on a display unit for a setting related to first processing, one of a plurality of selection items including a first selection item and a second selection item in response to an operation performed on the selection member, wherein the first selection indicates that the first processing is to be executed and the second selection item indicates that the first processing is not to be executed,
   wherein in a case where the first selection item is selected on the first setting screen, executing the first processing in response to an operation performed on the second operation member, but not executing the first processing in response to an operation performed on the first operation member,
   wherein in a case where the second selection item is selected on the first setting screen, changing the first setting screen to a screen different from the first setting screen in response to an operation performed on the first operation member, and
   wherein the first setting screen is a screen for determining whether to execute the first processing.

17. An electronic device comprising:
   a selection member;
   a first operation member;
   a second operation member located farther from the selection member than the first operation member; and
   at least one memory and at least one processor which function as:
   a control unit that selects, on a first setting screen displayed on the display unit for a setting related to first processing, one of a plurality of selection items including a first selection item and a second selection item in response to an operation performed on the selection member, wherein the first selection item indicates that the first processing is to be executed and the second selection item indicates that the first processing is not to be executed,
   wherein in a case where the first selection item is selected on the first setting screen, the control unit performs control to execute the first processing in response to an operation performed on the second operation member but does not execute the first processing in response to an operation performed on the first operation member, wherein in a case where the second selection item is selected on the first setting screen, the control unit performs control to change the first setting screen to a screen different from the first setting screen in response to an operation performed on the first operation member, wherein in a case where a third selection item related to second processing is selected from the third selection item and a fourth selection item on a second setting screen for setting a setting related to the second processing different from the first processing, the control unit performs control to set the third selection item in response to an operation performed on the first operation member, and wherein in a case where the fourth selection item is selected, the control unit performs control to set the fourth selection item in response to an operation performed on the first operation member.

18. An electronic device comprising:

a selection member;

a first operation member;

a second operation member located farther from the selection member than the first operation member; and at least one memory and at least one processor which function as:

a control unit that selects, on a first setting screen displayed on the display unit for a setting related to first processing, one of a plurality of selection items including a first selection item and a second selection item in response to an operation performed on the selection member, wherein the first selection item indicates that the first processing is to be executed and the second selection item indicates that the first processing is not to be executed, wherein in a case where the first selection item is selected on the first setting screen, the control unit performs control to execute the first processing in response to an operation performed on the second operation member but does not execute the first processing in response to an operation performed on the first operation member, wherein in a case where the second selection item is selected on the first setting screen, the control unit performs control to change the first setting screen to a screen different from the first setting screen in response to an operation performed on the first operation member, and wherein in a case where the second selection item is selected on the first setting screen, the control unit performs control to change the first setting screen to the screen different from the first setting screen in response to an operation performed on the second operation member.

19. An electronic device comprising:

a selection member;

a first operation member;

a second operation member located farther from the selection member than the first operation member; and at least one memory and at least one processor which function as:

a control unit that selects, on a first setting screen displayed on the display unit for a setting related to first processing, one of a plurality of selection items including a first selection item and a second selection item in response to an operation performed on the selection member, wherein the first selection item indicates that the first processing is to be executed and the second selection item indicates that the first processing is not to be executed, wherein in a case where the first selection item is selected on the first setting screen, the control unit performs control to execute the first processing in response to an operation performed on the second operation member but does not execute the first processing in response to an operation performed on the first operation member, wherein in a case where the second selection item is selected on the first setting screen, the control unit performs control to change the first setting screen to a screen different from the first setting screen in response to an operation performed on the first operation member, and wherein the first processing is recording medium formatting.

20. An electronic device comprising:

a selection member;

a first operation member;

a second operation member located farther from the selection member than the first operation member; and at least one memory and at least one processor which function as:

a control unit that selects, on a first setting screen displayed on the display unit for a setting related to first processing, one of a plurality of selection items including a first selection item and a second selection item in response to an operation performed on the selection member, wherein the first selection item indicates that the first processing is to be executed and the second selection item indicates that the first processing is not to be executed, wherein in a case where the first selection item is selected on the first setting screen, the control unit performs control to execute the first processing in response to an operation performed on the second operation member but does not execute the first processing in response to an operation performed on the first operation member, wherein in a case where the second selection item is selected on the first setting screen, the control unit performs control to change the first setting screen to a screen different from the first setting screen in response to an operation performed on the first operation member, and wherein in a case where the first selection item is selected, the control unit performs control to display a guide indicating that the first selection item is settable by operating the second operation member.

* * * * *